Patented Apr. 21, 1925.

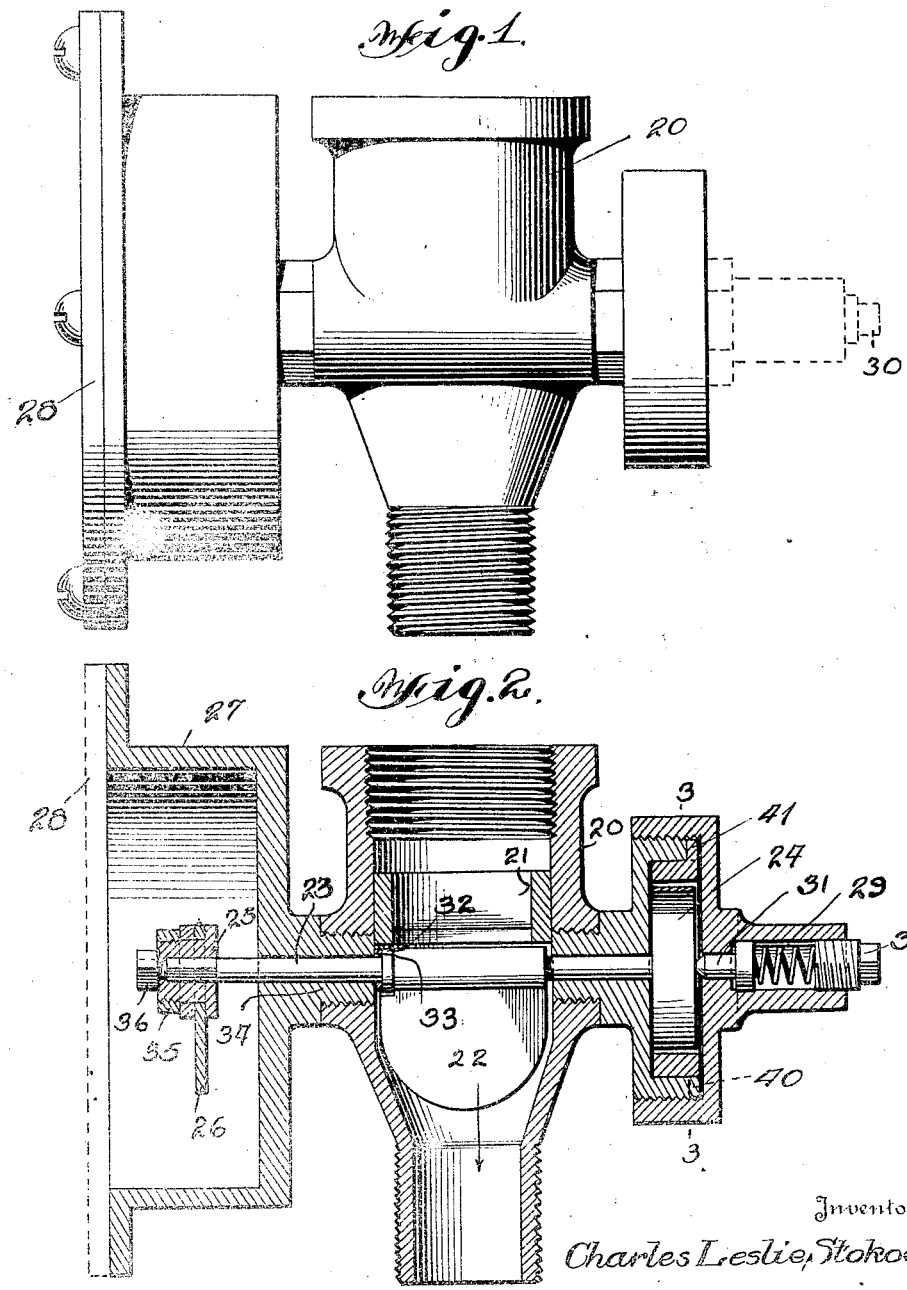

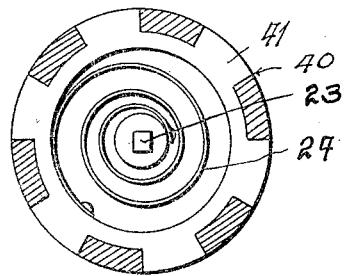
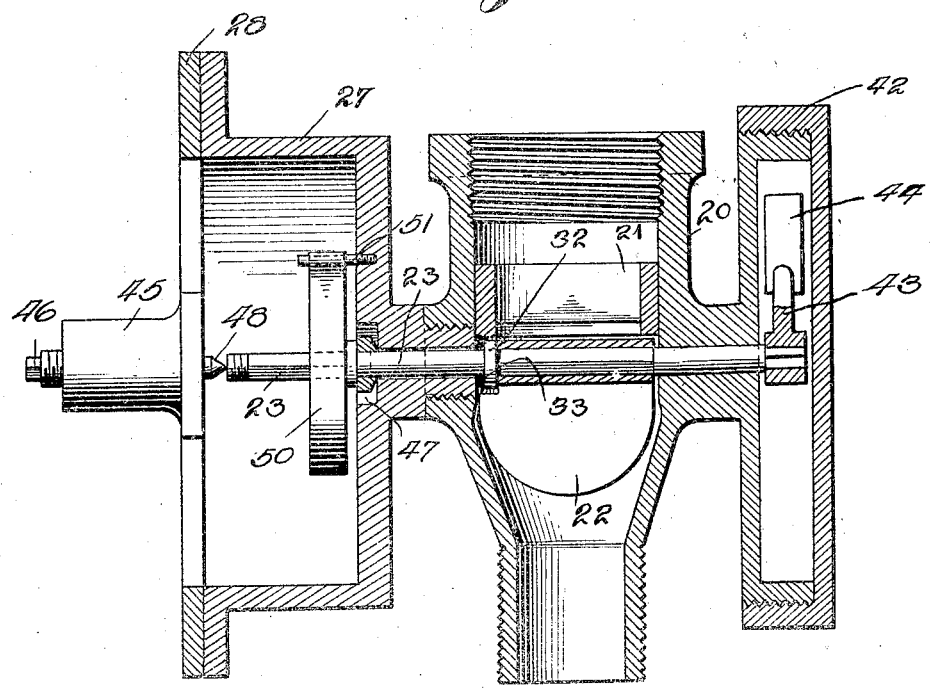

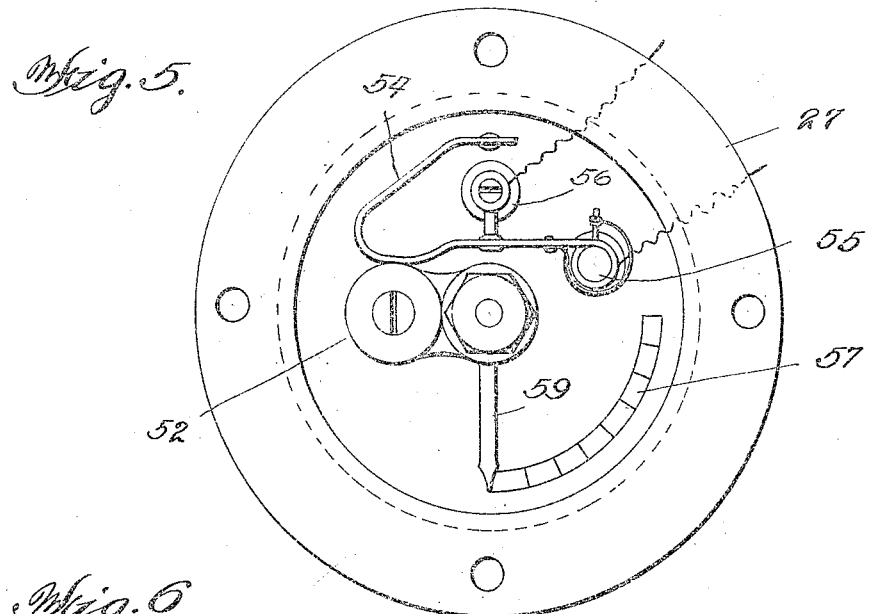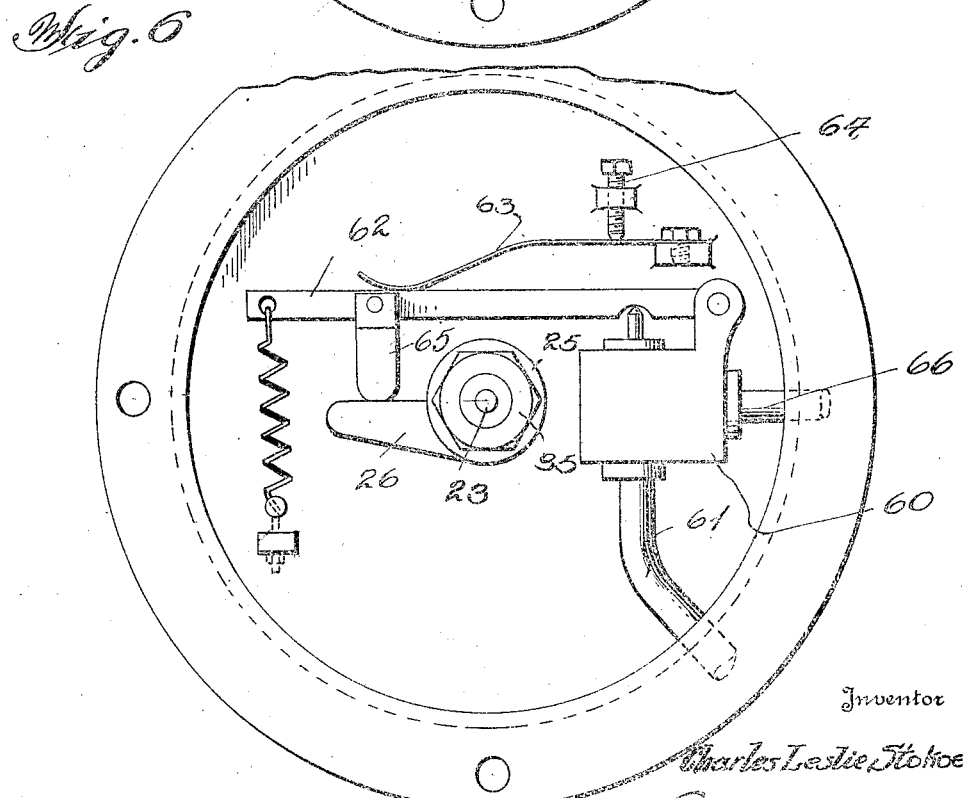

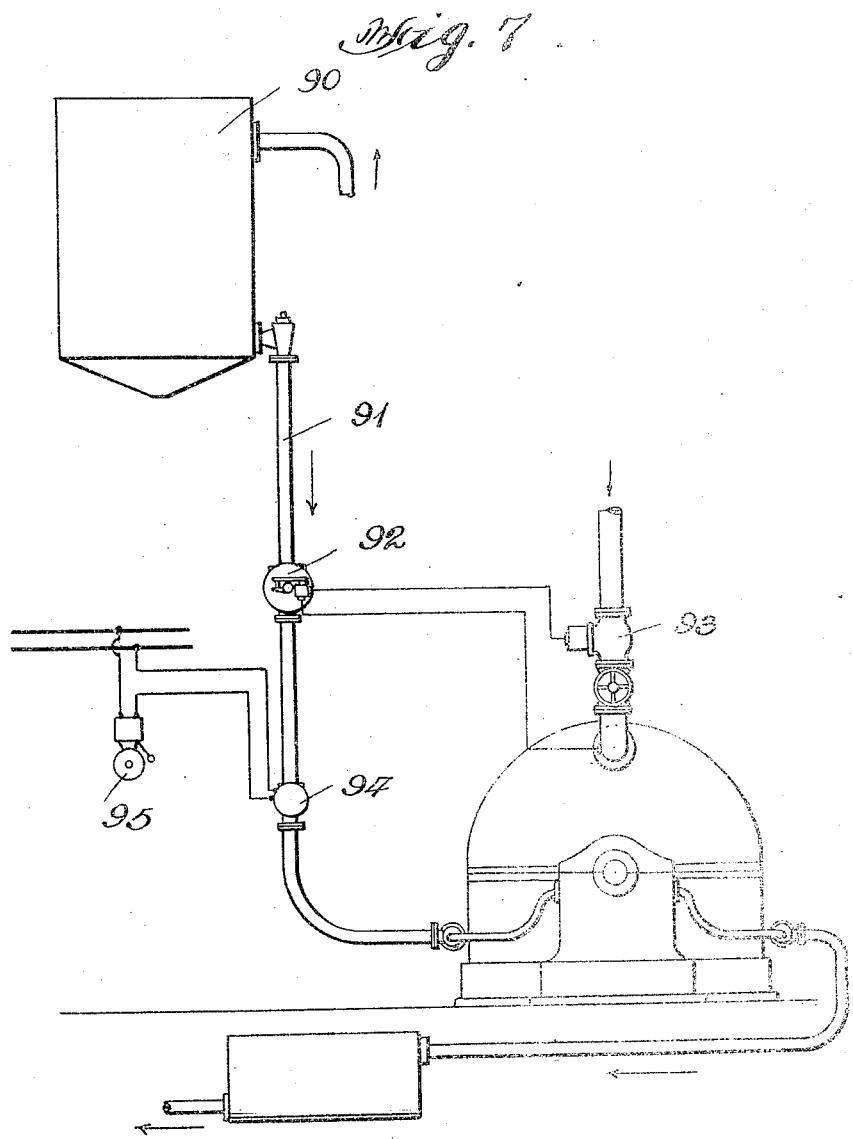

1,534,881

UNITED STATES PATENT OFFICE.

CHARLES L. STOKOE, OF WALLSEND-ON-TYNE, ENGLAND.

SAFETY APPARATUS FOR CONTROLLING THE FLOW OF FLUID IN PIPES.

Application filed July 3, 1922. Serial No. 572,602.

*To all whom it may concern:*

Be it known that CHARLES L. STOKOE, a subject of the King of Great Britain, residing at Wallsend-on-Tyne, in the county of Northumberland, England, and Kingdom of Great Britain, has invented certain new and useful Improvements in Safety Apparatus for Controlling the Flow of Fluid in Pipes, of which the following is a specification.

This invention relates to safety apparatus for controlling the flow of fluids in pipes, and more particularly to apparatus adapted to give an alarm signal when the flow of fluid through said pipe decreases to a material extent.

One of the objects of the present invention is the provision of apparatus of the above general character adapted to be used in connection with pipes for transmitting fluids which will give an audible or visual signal when the flow of said liquid ceases or decreases to a material extent, or to throw into operation other mechanism whereby the objection to the working of the apparatus as a whole is overcome.

In order that a clear perception of the present invention and the above object may be had it may be stated that in certain types of mechanisms such, for example, as cooling systems in connection with air compressors or condensers or other similar systems, where a cooling fluid is used, it is essential in order to obtain the greatest efficiency of the system to have a continuous flow of the cooling fluid at all times. If for any reason this cooling fluid ceases to flow through the piping, an alarm is given in any desired manner for indicating that the flow of liquid has decreased to a material extent or other mechanism is operated, such as the closing of an electric circuit, whereby the remainder of the system is put out of operation for the time being until the flow of fluid is again resumed.

It is, therefore, a further object of the invention to provide a mechanism of the above general character which will be reliable and efficient in use and operation.

Another object is to provide a simple, compact and self-contained device which may be easily placed in the main flow pipe and connected with the remaining portion of the system for giving the alarm or stopping the operation of the system, as and when desired in cases of cessation of flow of the cooling fluid.

While the invention will be hereinafter described with relation to its application as above stated, it is, of course, to be understood that without material modification it may be applied to other types of apparatus operating in a substantially similar manner.

Other objects will be in part obvious and in part hereinafter pointed out in connection with the accompanying sheets of drawings illustrating various possible modifications of the present invention and its application.

In these drawings, wherein similar reference characters are indicated by corresponding parts,—

Figure 1 is an elevational view of the exterior of one embodiment of the present invention;

Figure 2 is a central vertical sectional view of the parts shown in Figure 1;

Figure 3 is a detail view, taken substantially on the line 3—3, Figure 2;

Figure 4 is a view similar to Figure 2, showing a slight modification;

Figure 5, is a side elevational view showing one type of make or break switch with indicating dial;

Figure 6 is a side elevational view showing the mechanism applied to a pilot valve;

Figure 7 is a diagrammatic elevational view of a portion of the complete system.

Referring now to the drawings in detail and more particularly Figure 1, there is shown a valve casing member 20 provided on its interior with a deflector 21 beneath which is positioned a pivotally mounted flap valve 22; the water or other fluid passing in through the top and out through the lower opening as indicated by the arrows in Figure 2. The flap valve is of a form adapted to substantially close the opening in the member 21, when in horizontal position and is mounted upon a signal or alarm control spindle or shaft 23, one end of which engages a coil spring 24 shown in detail in Figure 3, while to the opposite end is secured a member or boss 25 having an arm 26 of the general type shown in Figure 6. These parts 25 and 26 are mounted within a suitable casing 27 adapted to be closed by a suitable end plate 28. The casing is adapted to contain or house the signal or alarm control mechanism shown in Figure 5 for example. This cover plate serves two purposes, one being to form a closed chamber and the other to serve as a convenient base for the external members when the trip gear hereinafter explained is used. At the opposite end of the shaft 23 is provided a compression spring 29 adapted to be adjusted by a suitable nut 30 so as to give the required axial thrust upon the stud 31, which in turn transmits this thrust to the valve shaft 23. This valve shaft 23 carries a collar 32 which is pressed against a washer 33 to prevent leakage of the internal fluid through the bearings of the shaft. The formation of the washer is especially adapted to provide a fluid tight surface in contact with the face of bearing 34 for the shaft 23, and with this object in view the material of the washer is preferably of a resilient nature of either rubber or leather or the like.

In order to reduce face friction between the resilient washer and its bearing, there is preferably interposed an additional washer or washers of anti-friction material. One end of the shaft 23 projects into the operating casing 27 and carries the lever 26 as previously explained, which may be set to any desired angle by means of jam nuts 35. The boss 25 is kept in position by a smaller nut 36 on the end of the spindle.

In order to provide the necessary torsion to the spindle to automatically close the valve on cessation of flow of the fluid in the pipe, there is preferably provided in one case the spring 24 of ordinary clock type, one end being attached to a boss fitted on the square end of the spindle, the opposite end being attached to the case which may be provided with one or more teeth 40 in the case. Thus the tension of the spring may be set to any desired amounts by slightly drawing out the part 41, as shown in Figure 3, and revolving it to the required angle and then sliding it back to its former position in engagement with the toothed rim.

In Figure 4 there is shown a slight modification employing an enclosed lever and weight-loading spindle, the case 42 holding a lever 43 or its balance-weight 44; at the opposite end of the shaft 23 there is employed a compression box 45 with its adjusting means 46, the box being carried by a bridge across the face plate 28. The resilient washer or its equivalent 47 is in this manner compressed up against the face of the bearing for the shaft 23, thereby to form a water-tight joint yet one capable of permitting revolution of the shaft or spindle. Axial thrust is provided by a stud or needle point 48. An alternative arrangement of clock type spring is shown at 50, where the angular adjustment is made by the position of the stud 51, secured to the outer end of the spring and adapted to engage a series of holes in the casing 27.

In Figure 5 there is illustrated a type of electric switch suitable for throwing open or closed operating box 27. The lever 26 carries an insulating piece 52 which, on cessation of flow in the pipes rises and tilts a hinge member 54 in free electrical connection with a terminal 55. The other terminal is provided with a contact piece 56, which, when in the position shown in the drawings, comes in contact with the member 54 on cessation of flow. When, however, this piece is reversed to the upper part, thereby tilting the member 54 and causing it to recede, the electrical circuit is broken. It will now be evident that if the safety apparatus is fitted in the pipe line, and the closed operating box used, the switch may work in oil and at the same pressure as the pipe line and without leakage or friction of the spindle due to fluid thrust. Further, in cases where the pipes convey, say, water at a low pressure the closed box can be used and the electrical parts be in the air space of the operating box. This provides for the fitting of a closed front whereby the parts may be kept under observation. There may be provided a pointer 59 to indicate the relative flow on the dial 57.

In Figure 6, there is shown a pilot valve combined with the operating box. In this arrangement a metal case 60 is adapted to contain a lift valve normally maintained on its seat against the compressed air or steam pressure in pipe 61, by the leverage of the spring or weight-load lever 62. The spring may be in the form, as indicated at 63, adjustable by screw 64. The effective tilting effort may be regulated in any desired manner as by the positions of the stop member 65 coacting with the lever 26. The pilot valve may admit compressed air or steam to a stronger operating system through outlet pipe 66 to any other desired mechanism associated with the system for sounding an alarm or stopping the apparatus.

In Fig. 7 there is shown the complete system in which the fluid is adapted to flow from tank 90 down through pipe 91, past the control mechanism 92, which may be of the electrical operating type for controlling the valve mechanism 93. A safety device 94 is also applied for actuating the alarm 95, all of which will be clear to those skilled in the art.

Having thus described my invention what I claim as new and desire to secure by Letters Patent is:—

1. In apparatus of the character described, in combination, a pipe through which a fluid is adapted to pass, a valve member positioned in said pipe and normally held open under the action of the moving fluid, means adapted to close said valve when the flow of fluid is materially decreased or stopped, a spindle operable by said valve, said pipe having a bearing for the spindle, alarm control mechanism operable by said spindle, means adapted to prevent leakage of the fluid along the spindle to the alarm control mechanism comprising washer means mounted upon the spindle, and spring means for sliding said spindle laterally to hold said washer means against the bearing.

2. In apparatus of the character described, in combination, a pipe through which a fluid is adapted to pass, a valve within said pipe normally held open by the passage of said fluid, a spindle rotatable by said valve as said valve moves to closed position, a spring box into which said spindle projects, a compression member in said box adapted to coact with the adjacent end of said spindle and slide the same, alarm control mechanism operable by the spindle, and means to prevent leakage of fluid along the spindle to said mechanism operatively positioned by the sliding movement of the spindle.

3. In apparatus of the character described, in combination, a pipe through which a fluid is adapted to pass, a valve within said pipe, normally held open by the passage of said fluid, a spindle rotatable by said valve as said valve moves to closed position, alarm control mechanism operable by said spindle, means on the spindle engageable with the pipe to prevent leakage along the spindle to said mechanism, a spring box into which said spindle projects, a compression member in said box adapted to coact with the adjacent end of said spindle and slide the same laterally to operatively position said means, and means to rotate the spindle upon diminution of fluid pressure in the pipe.

4. In apparatus of the character described, in combination, a pipe through which a fluid is adapted to pass, a valve within said pipe normally held open by the passage of said fluid, a spindle rotatable by said valve as said valve moves to closed position, a spring box into which said spindle projects, a compression member in said box adapted to coact with the adjacent end of said spindle to move the same laterally, means operable to rotate said spindle upon diminution of fluid pressure in the pipe, a pilot valve, means to normally hold said pilot valve closed, and means for actuating the last mentioned means to permit opening of said pilot valve when said spindle is rotated.

5. In apparatus of the character described, in combination, a pipe through which a fluid is adapted to pass, a valve member positioned in said pipe movable with the fluid and subject to the fluctuation in flow thereof, an alarm control spindle rigid with said valve extending through the pipe to the exterior thereof, means coacting with the spindle exteriorly of the pipe to form a flow indicator, packing means to prevent escape of fluid through said pipe along said spindle, and a spring device to urge lateral movement of the spindle in the direction of the flow indicator to increase the efficiency of the last mentioned means.

In testimony whereof I affix my signature.

CHARLES L. STOKOE.